United States Patent
Itoh et al.

(10) Patent No.: US 8,184,238 B2
(45) Date of Patent: May 22, 2012

(54) PLANAR ILLUMINATION DEVICE AND LIQUID CRYSTAL DISPLAY DEVICE USING THE SAME

(75) Inventors: Tatsuo Itoh, Osaka (JP); Shinichi Shikii, Nara (JP); Takayuki Nagata, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 12/513,264

(22) PCT Filed: Sep. 1, 2008

(86) PCT No.: PCT/JP2008/002387
§ 371 (c)(1),
(2), (4) Date: May 1, 2009

(87) PCT Pub. No.: WO2009/031289
PCT Pub. Date: Mar. 12, 2009

(65) Prior Publication Data
US 2010/0073600 A1      Mar. 25, 2010

(30) Foreign Application Priority Data
Sep. 4, 2007    (JP) ................................ 2007-228521

(51) Int. Cl.
*G02F 1/1335* (2006.01)
(52) U.S. Cl. ........................................................ 349/65
(58) Field of Classification Search .............. 349/61–62, 349/65
See application file for complete search history.

(56) References Cited

U.S. PATENT DOCUMENTS

| | | | | |
|---|---|---|---|---|
| 6,801,270 | B2 * | 10/2004 | Faris et al. | ........................ 349/61 |
| 2002/0176035 | A1 * | 11/2002 | Yamazaki | ........................ 349/61 |
| 2003/0156233 | A1 * | 8/2003 | Ohsumi | ........................ 349/65 |
| 2007/0030690 | A1 | 2/2007 | Lester | |
| 2009/0322985 | A1 * | 12/2009 | Mizuuchi | ........................ 349/62 |

FOREIGN PATENT DOCUMENTS

| | | |
|---|---|---|
| JP | 2005-340160 | 12/2005 |
| JP | 2007-42640 | 2/2007 |
| WO | 2007/074784 | 7/2007 |
| WO | 2008/078543 | 7/2008 |
| WO | 2008/126348 | 10/2008 |

OTHER PUBLICATIONS

International Search Report issued Dec. 2, 2008 in the International (PCT) Application No. PCT/JP2008/002387.

* cited by examiner

*Primary Examiner* — Eric Wong
(74) *Attorney, Agent, or Firm* — Wenderoth, Lind & Ponack, L.L.P.

(57) ABSTRACT

A planar illumination device 10 is provided with a laser light source 11 for emitting laser light, a light source side bundle fiber 12 having one end surface thereof optically connected with the laser light source 11, a flat light guide plate 13, a plurality of connection side fibers 16 planarly arranged in parallel with each other at a side surface of the light guide plate 13, and a light guiding fiber 14 for guiding the laser light from the light source side bundle fiber 12 to the plurality of connection side fibers 16. The laser light is incident on the side surface of the light guide plate 13 from the plurality of connection side fibers 16 via a plurality of fiber collimators 17 and output light is uniformly emitted from one principal surface of the light guide plate 13.

12 Claims, 11 Drawing Sheets

PLANAR ILLUMINATION DEVICE AND LIQUID CRYSTAL DISPLAY DEVICE USING THE SAME

BACKGROUND OF THE INVENTION

1. Field of Technology

The present invention relates to a high-luminance planar illumination device using a laser light source and used in a non-emissive display device such as a liquid crystal television and a liquid crystal display device using the same.

2. Description of the Background Art

A liquid crystal display device adopts a method for displaying an image by controlling a transmission amount of light irradiated from behind utilizing an electrooptic effect by the orientation of liquid crystal molecules and generally requires a planar illumination device called a backlight unit formed by fluorescent display tubes. In recent years, screens of such liquid crystal display devices have become larger and display devices for televisions of 50 inches and larger have been put to practical use. However, since power consumption has also been increased as screens have become larger, technological development for realizing lower power consumption is hoped for and it is strongly demanded to thin display devices in order to maximally reduce indoor spaces taken up by display devices.

In order to deal with lower power consumption out of such demands, it has been studied to use light-emitting diodes and laser light sources with good emission efficiency, and planar illumination devices using light emitting diodes as light sources have been already put to practical use.

It has been, for example, proposed that an optical fiber is connected with a side surface of a light guide plate called a light pipe and having a scattering center for scattering light, laser light from a laser light source is guided via this optical fiber to be incident on the light guide plate and scattered by the scattering center to emit output light from a principal surface of the light guide plate, whereby this construction is caused to function as a backlight unit (see, for example, patent literature 1). The laser light source can be arranged at an optimal position in terms of heat radiation by doing so, whereby it is tried to realize a lower power consuming and thin planar illumination device.

It has been also proposed that a plurality of slits are formed at one end of a transparent sheet, pieces between these slits are placed one over another to form a strip-shaped light guiding portion and light from a LED light source is incident on this strip-shaped light guiding portion to guide the light to the transparent sheet and output light is emitted from a surface of this light guiding sheet by scattering the light propagating in the sheet (see, for example, patent literature 2). By doing so, it is tried to realize a lightweight sheet-shaped planar illumination device with a uniform illuminance distribution.

However, in the prior arts described above, it is proposed to realize thinner planar illumination devices, but only insufficient numbers of the optical fibers and the strip-shaped light guiding portion are connected with the light guide plates and connecting structures with the light guide plates are not elaborated. Therefore, there is a problem of being unable to realize sufficiently accurate uniformity of output light from one principal surface of the light guide plate.

Patent Literature 1:
 Japanese Unexamined Patent Publication No. 2007-42640
Patent Literature 2:
 Japanese Unexamined Patent Publication No. 2005-340160

SUMMARY OF THE INVENTION

An object of the present invention is to provide a thin planar illumination device capable of reducing speckle noise of output light and emitting accurately uniform output light with low power consumption and a liquid crystal display device using the same.

One aspect of the present invention is directed to a planar illumination device comprising a laser light source for emitting laser light; a light source side bundle fiber having one end surface thereof optically connected with the laser light source; a flat light guide plate; a plurality of connection side fibers planarly arranged in parallel with each other at a side surface of the light guide plate; and a light guiding member for guiding the laser light from the light source side bundle fiber to the plurality of connection side fibers, wherein the laser light is incident on the side surface of the light guide plate from the plurality of connection side fibers and output light is uniformly emitted from one principal surface of the light guide plate.

In this planar illumination device, the laser light from the laser light source is transmitted to the light guide plate without almost any loss via the light source side bundle fiber, the light guiding member and the plurality of connection side fibers, incident on the light guide plate after being branched off into a multitude of beams by the plurality of connection side fibers and emitted as the output light. Thus, speckle noise of the output light can be reduced and the accurately uniform output light can be emitted with low power consumption.

BEST MODES FOR EMBODYING THE INVENTION

Figure 1:
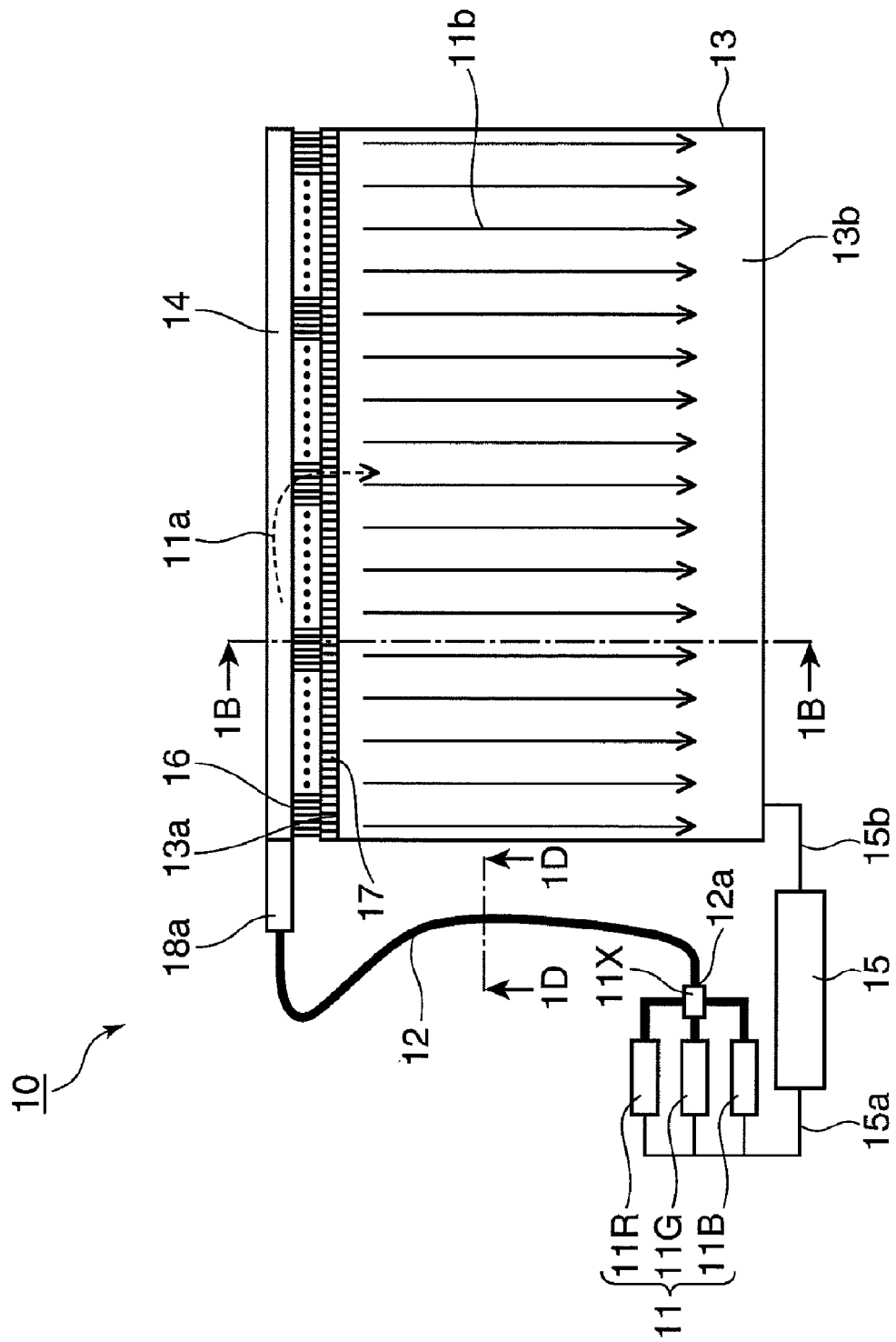
FIG. 1 is a plan view diagrammatically showing the entire construction of a planar illumination device according to a first embodiment of the invention.

Hereinafter, embodiments of the present invention are described with reference to the drawings. It should be noted that the same elements are identified by the same reference numerals and may not be repeatedly described in some cases.

(First Embodiment)

Figure 2:
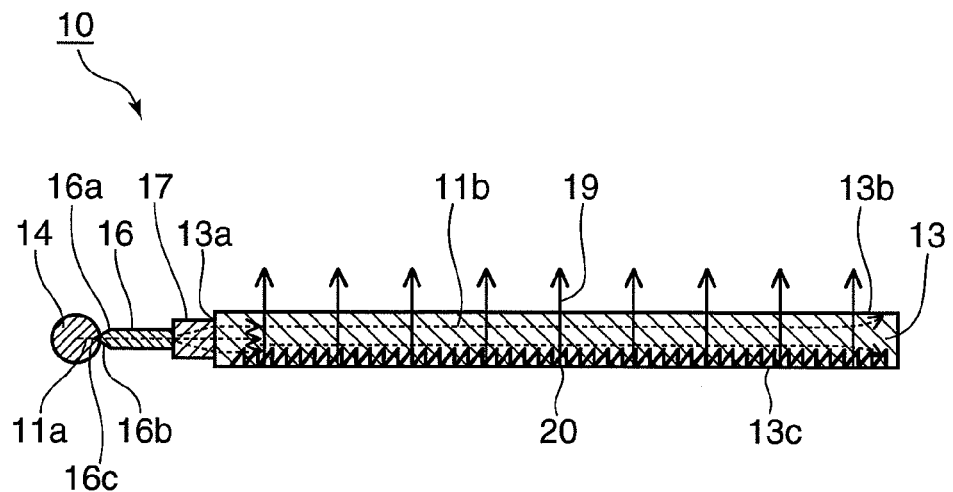
FIG. 2 is a section of the planar illumination device along 1B-1B of FIG. 1.
Figure 3:
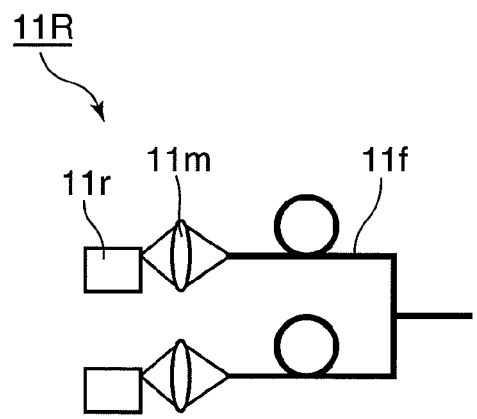
FIG. 3 is a diagram showing a construction example of a laser light source shown in FIG. 1.
Figure 4:
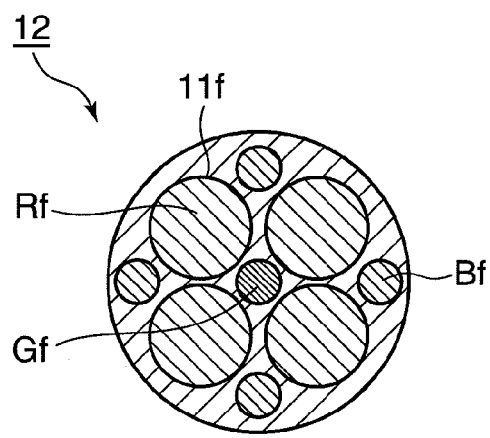
FIG. 4 is a section of a light source side bundle fiber along 1D-1D of FIG. 1.

FIGS. 1 and 2 are schematic construction diagrams of a planar illumination device 10 according to a first embodiment of the present invention, wherein FIG. 1 is a plan view diagrammatically showing the entire construction of the planar illumination device 10 and FIG. 2 is a section of the planar illumination device 10 along 1B-1B of FIG. 1. FIG. 3 is a diagram showing a construction example of a laser light source 11 of the planar illumination device 10 shown in FIG. 1, and FIG. 4 is a section of a light source side bundle fiber 12 along ID-ID of FIG. 1. Although the respective parts of the planar illumination device 10 are shown to be separated in order to facilitate the understanding of the respective constructions in FIG. 1, they are placed on or within an unillustrated base plate or a frame in an actual construction to be entirely and integrally fixed.

As shown in FIGS. 1 and 2, the planar illumination device 10 according to this embodiment is provided with a laser light source 11, the light source side bundle fiber 12 having one end surface 12a optically connected with the laser light source 11, a light guide plate 13, a light guiding fiber 14, a controller 15 for controlling at least the laser light source 11, a plurality of connection side fibers 16 and a plurality of fiber collimators 17 and a mixed fiber 18a.

As shown in FIG. 1, the laser light source 11 is a RGB light source comprised of at least a red laser light source (R light source) 11R, a green laser light source (G light source) 11G and a blue laser light source (B light source) 11B and laser light (not shown) from this RGB light source 11 is incident on the one end surface 12a of the light source side bundle fiber 12.

The light source side bundle fiber 12 is connected to the light guiding fiber 14 via the mixed fiber 18a. This is designed for the purpose that laser light is incident on the light guiding fiber 14 after laser light of the respective wavelengths is uniformly mixed in the mixed fiber 18a when the laser light is guided according to the respective wavelengths by individual fibers in the laser light source bundle fiber 12 as described later.

The light guiding fiber 14 is for optically connecting the laser light source bundle fiber 12 and the plurality of connection side fibers 16 and is arranged to face a side surface 13a of the light guide plate 13. Here, the plurality of connection side fibers 16 are planarly arranged in a row in parallel with each other at the side surface 13a of the light guide plate 13, and the plurality of fiber collimators 17 are planarly arranged in a row in parallel with each other in conformity with the plurality of connection side fibers 16. The plurality of connection side fibers 16 are connected with the side surface 13a of the light guide plate 13 via the plurality of fiber collimators 17.

Here, the plurality of connection side fibers 16 and the plurality of fiber collimators 17 are preferably densely and closely arranged. For example, it is preferable to arrange several tens of connection side fibers and fiber collimators, more preferable to arrange several hundreds of connection side fiber and fiber collimators, and even more preferable to arrange the number of connection side fiber and fiber collimators corresponding to the number of pixels of a liquid crystal display device using the planar illumination device 10 as a backlight illumination device. The arrangement of the plurality of connection side fibers 16 and the plurality of fiber collimators 17 is not particularly limited to the above example, and various changes can be made, for example, by arranging the connection side fibers and the fiber collimators in two or more rows, arranging them at specified intervals or arranging them in an offset manner.

Laser light (not shown) emitted from the laser light source 11 is incident on the light guiding fiber 14 via the light source side bundle fiber 12 and laser light 11a is emitted to the plurality of connection side fibers 16 while being distributed, thereby being incident on the light guide plate 13 via the plurality of fiber collimators 17, and output light 19 is uniformly emitted from one principal surface 13b of the light guide plate 13.

Further, as shown in FIG. 2, each of the plurality of connection side fibers 16 includes a contact portion 16b having a tapered cross section at one end 16a thereof, the light guiding fiber 14 is optically connected with the plurality of connection side fibers 16 at contact parts 16c at the leading ends of the contact portions 16b. The laser light 11a is incident on the plurality of connection side fibers 16 after passing the contact parts 16c from the light guide plate 14, converted into parallel light by the fiber collimators 17 and guided to the light guide plate 13.

As shown in FIG. 2, for example, a plurality of mirrors 20 are so formed on the other principal surface 13c facing the one principal surface 13b in the light guide plate 13 as to have a bar arrangement in parallel with the side surface 13a connected with the plurality of connection side fibers 16 via the fiber collimators 17. By doing so, if the laser light 11a is incident on the light guide plate 13, for example, such that a beam waist (part of the laser light with a smallest diameter in the light guide plate 13) thereof is located on the side surface 13a, it propagates in the light guide plate 13 while slightly spreading as shown in FIG. 2.

As a result, the laser light 11b is reflected upwardly by the mirrors 20 in the bar arrangement and is uniformly emitted as output light 19 from the one principal surface 13b of the light guide plate 13. As shown in FIG. 2, the laser light 11b propagates from the left side toward the right side of the light guide plate 13 to perform a display. The construction of the light guide plate 13 is not particularly limited to the above example using the mirrors 20 and various other constructions can be adopted provided that the output light 19 can be uniformly emitted from the one principal surface 13b.

The laser light source 11 and the light guide plate 13 are electrically connected to the controller 15 via wirings 15a and 15b to be controlled by the controller 15. A light receiving element (not shown) is arranged at a specified position of the light guide plate 13 to measure the light quantity of the laser light 11b, and the light quantity of laser light (not shown) to be emitted from the laser light source 11 can be adjusted according to the measured light quantity.

By employing such a construction, the laser light 11a from the laser light source 11 can be transmitted to the light guide plate 13 without almost any loss by the optical fibers (light source side bundle fiber 12, mixed fiber 18a, light guiding fiber 14 and connection side fibers 16), wherefore the laser light 11a can be efficiently utilized and a thin planar illumination device 10 operable with low power consumption can be realized.

Further, since the laser light 11a is incident on the light guide plate 13 after being branched off into a multitude of beams by the plurality of connection side fibers 16 and is emitted as the output light 19 without phase alignment, speckle noise of the output light 19 can be sufficiently reduced.

Figure 5:
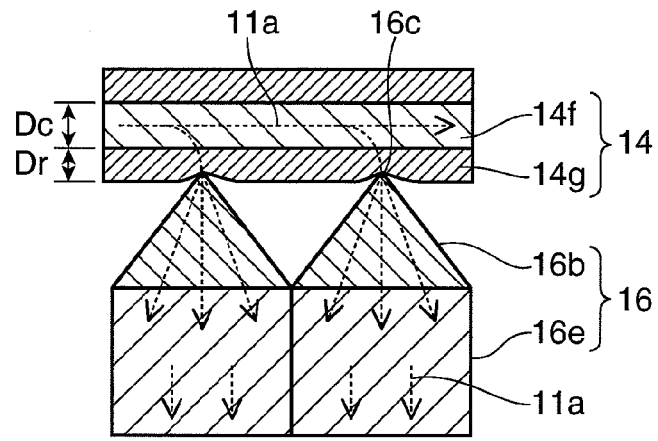
FIG. 5 is a schematic section enlargedly showing contact parts of a light guiding fiber and connection side fibers and parts of the connection side fibers in the planar illumination device according to the first embodiment of the invention.
Figure 6:
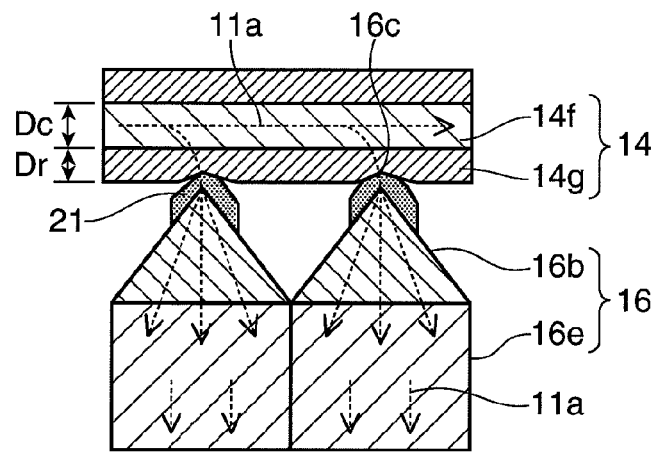
FIG. 6 is a schematic section enlargedly showing contact parts of the light guiding fiber and the connection side fibers and parts of the connection side fibers in another construction example of the light guiding fiber and the connection side fibers usable in the planar illumination device according to the first embodiment of the present invention.
Figure 7:
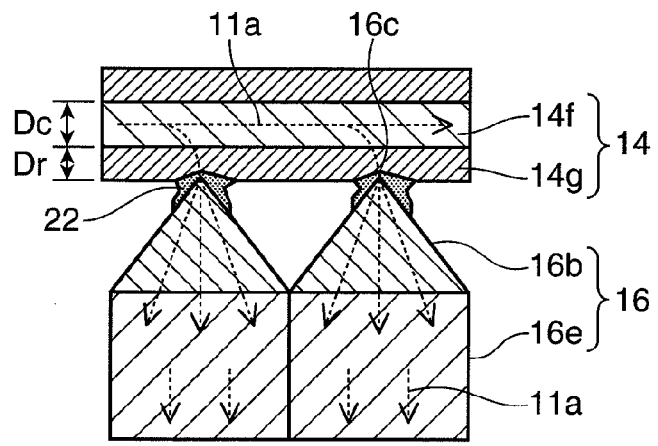
FIG. 7 is a schematic section enlargedly showing contact parts of the light guiding fiber and the connection side fibers and parts of the connection side fibers in still another construction example of the light guiding fiber and the connection side fibers usable in the planar illumination device according to the first embodiment of the present invention.

Furthermore, since a structure for connecting the light guiding fiber 14, the connection side fibers 16 and the like for causing the laser light 11a from the laser light source 11 to be incident on the light guide plate 13 is elaborated as shown in FIGS. 5 to 7 to be described later, the laser light 11a with accurate uniformity in a direction along the side surface 13a can be incident on the side surface 13a. As a result, the output light 19 can be highly uniformly emitted from the one principal surface 13b of the light guide plate 13.

Each of the R light source 11r, the G light source 11G and the B light source 11B may be comprised of a plurality of laser light sources. For example, the R light source 11R may be comprised of a plurality of red semiconductor laser elements (R elements) 11r, an optical fiber 11f and an objective lens 11m for optically coupling the plurality of red semiconductor laser elements 11r with the optical fiber 11f as shown in FIG. 3. The G light source 11G and the B light source 11B may be similarly comprised of a plurality of laser light sources.

A section of the light source side bundle fiber 12 along 1D-1D of FIG. 1 is shown in FIG. 4. The light source side bundle fiber 12 has a cross section shown in FIG. 4 by collecting a plurality of optical fibers 11f from the R light source 11R, the G light source 11G and the B light source 11B by a fiber collecting portion 11X shown in FIG. 1. As shown in FIG. 4, R light, G light and G light necessary as a light source of the planar illumination device 10 are respectively guided toward the light guide plate 13, for example, by four R light fibers Rf, by one G light fiber Gf and by four B light fibers Bf. The numbers of the R, G and B light fibers Rf, Gf and Bf are not particularly limited to the above example and can be variously changed.

Although the plurality of optical fibers are bundled by the fiber collecting portion 11X here, the optical fibers 11f for guiding R light from the R elements 11r to the light guide plate 13 are, for example, bundled in the light source side bundle fiber 12 while being continuous without being interrupted halfway. The same holds for the G light fiber Gf and the B light fibers Bf.

For higher outputs, the R light source 11R and the B light source 11B can be respectively constructed by a plurality of red semiconductor lasers and by a plurality of blue semiconductor lasers. However, a higher output is enabled for the G light source 11G by using SGH (Second Harmonic Generation) light of laser light emitted from a semiconductor laser excitation solid state laser. Thus, it is preferable to arrange one G light fiber Gf in the center of the light source side bundle fiber 12 and arrange a plurality of R light fibers Rf and B light fibers Bf around it as shown in FIG. 4. In this case, high-power white illumination is obtained.

Further, as shown in FIG. 4, a plurality of optical fibers are bundled with respect to the RGB light source 11 such the optical fibers of the respective colors are axially symmetrical for the respective colors in the light source side bundle fiber 12, whereby white light with good angle distribution and in-plane uniformity of the quantity of light emerging from the mixed fiber 18a can be obtained.

A high-power red semiconductor laser is a wide stripe semiconductor laser and has a large stripe width of about 150 μm, but emission regions of a blue semiconductor laser and a green laser light source are small. Thus, the core diameter of the R light fibers Rf is preferably larger than those of the G light fiber Gf and the B light fibers Bf. The diameter of the light source side bundle fiber 12 could be reduced without impairing the coupling efficiency of the laser light source 11 and the respective optical fibers, for example, by setting the core diameter of the R light fibers Rf to 200 μm and those of the G and B light fibers Gf, Bf to 80 μm. Further, since the semiconductor laser has a varying wavelength, the interference of laser light is reduced simultaneously with the realization of a higher power by combining a plurality of semiconductor lasers, wherefore an effect of reducing the speckle noise was also obtained.

By employing such a construction, a wide color reproduction range and high image quality can be obtained if this planar illumination device 10 is used as a backlight illumination device of a liquid crystal display device.

Next, a connecting structure for the light guiding fiber 14 and the connection side fibers 16 shown in FIGS. 1 and 2 is described in detail. FIG. 5 is a schematic section enlargedly showing contact parts 16c of the light guiding fiber 14 and the connection side fibers 16 and parts of the connection side fibers 16 in the planar illumination device 10 of this embodiment.

In FIG. 5, the light guiding fiber 14 is comprised of a core 14f in the center and a cladding 14g covering the outer circumferential part of the core 14f. Here, the light guiding fiber 14 used is, for example, such that a diameter Dc of the core 14f is 100 μm and a thickness Dr of the cladding 14g is 12.5 μm. Each connection side fiber 16 is comprised of a cylindrical main portion 16e and a conical contact portion 16b having a tapered cross section, and the contact portion 16b is integrally formed at one end of the main portion 16e. A plurality of connection side fibers 16 are arranged in parallel while being held in close contact. The shape of the contact portions 16b is not particularly limited to the above example and another shape such as a pyramidal shape may be used provided that such a shape is a pointed shape having a tapered cross section.

As shown in FIG. 5, the propagating laser light 11a is confined in the core 14f and a part of the laser light 11a is extracted from the light guiding fiber 14 to the contact portion 16b via the contact part 16c if the contact portion 16b comes into contact with an outer circumferential portion of the cladding 14g of the light guiding fiber 14. The part of the laser light 11a transmitted from the core 14f in this way is understood to be guided toward the contact portion 16b in the contact part 16c.

By employing such a construction, the laser light 11a propagating in the light guiding fiber 14 can be efficiently extracted to the light guide plate 13 without any loss via the connection side fibers 16 and the fiber collimators 17 as shown in FIG. 2, wherefore the output light 19 with uniform light intensity can be emitted from the entire one principal surface 13b of the light guide plate 13.

Next, other construction examples for efficiently guiding the laser light 11a from the light guiding fiber 14 to the contact portions 16b of the connection side fibers 16 via the above contact parts 16c are diagrammatically shown in FIGS. 6 and 7.

First of all, in the example shown in FIG. 6, coating films 21 for transmitting the laser light 11a are formed between the light guiding fiber 14 and the contact parts 16c of the connection side fibers 16. By setting the refractive index of the coating films 21, for example, higher than that of the cladding 14g of the light guiding fiber 14, the laser light 11a can be more easily extracted to the contact portions 16b by being concentrated on the contact parts 16c. Further, by making the coating films 21 of, for example, an organic optical material softer than the material of the contact portions 16b, adhesion of the light guiding fiber 14 and the contact portions 16b in the contact parts 16c can be increased, so that space is unlikely to be left therebetween. In this way, the laser light 11a can be efficiently guided to the contact portions 16b of the connection side fibers 16 without any loss.

By employing such a construction, the laser light 11a propagating in the light guiding fiber 14 as shown in FIG. 2 can be efficiently transmitted to the connection side fibers 16 via the coating films 21 without any loss and further efficiently extracted to the light guide plate 13 via the connection side fibers 16 and the fiber collimators 17 without any loss, whereby the output light 19 with uniform light intensity can be emitted from the entire one principal surface 13b of the light guide plate 13. Although the coating films 21 are formed only at the contact parts 16c of the contact portions 16b, they may be formed on the entire surfaces of the contact portions 16b of the connection side fibers 16.

Next, in the example shown in FIG. 7, the light guiding fiber 14 and the contact parts 16c of the contact portions 16b are bonded using an adhesive 22 for transmitting the laser light 11a. By setting the refractive index of this adhesive 22, for example, higher than that of the cladding 14g of the light guiding fiber 14, the laser light 11a can be more easily extracted to the contact portions 16b by being concentrated on the contact parts 16c. The adhesive 22 can fill up spaces formed between the light guiding fiber 14 and the contact portions 16b in the contact parts 16c to increase the adhesion of the light guiding fiber 14 and the contact portions 16b, thereby making it difficult to leave the spaces. In this way, the laser light 11a can be efficiently guided to the contact portions 16b without any loss.

By employing such a construction, the laser light 11a propagating in the light guiding fiber 14 can be efficiently extracted to the light guide plate 13 via the connection side fibers 16 and the fiber collimators 17 as shown in FIG. 2 without any loss via the adhesive 22, and the output light 19 with uniform light intensity can be emitted from the entire one principal surface 13b of the light guide plate 13.

Although the adhesive 22 is applied only to the contact parts 16c of the contact portions 16b, it may be applied to the entire surfaces of the contact portions 16b of the connection side fibers 16. Further, the mixed fiber 18a may function as a light guiding fiber between the light source side bundle fiber 12 and the connection side fibers 16 even if the light guiding fiber 14 is separately provided between the mixed fiber 18a and the connection side fibers 16. In such a case, light can be transmitted by connecting a bundle fiber of the connection side fibers 16 and the mixed fiber 18a.

(Second Embodiment)

Figure 8:
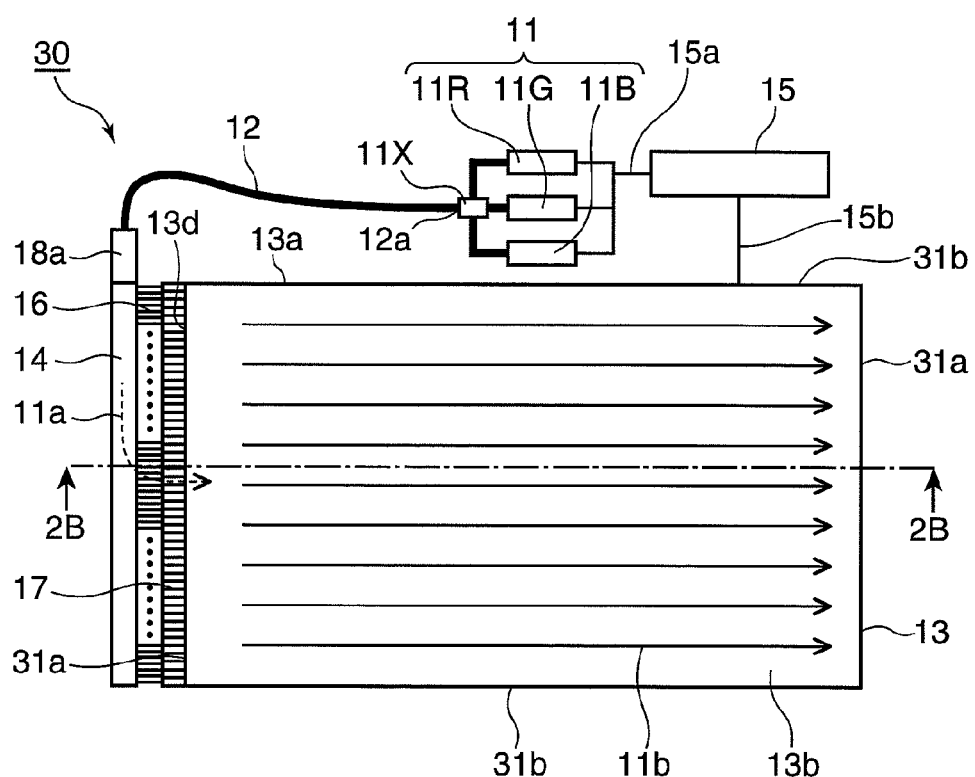
FIG. 8 is a plan view diagrammatically showing the entire construction of a planar illumination device according to a second embodiment of the invention.
Figure 9:
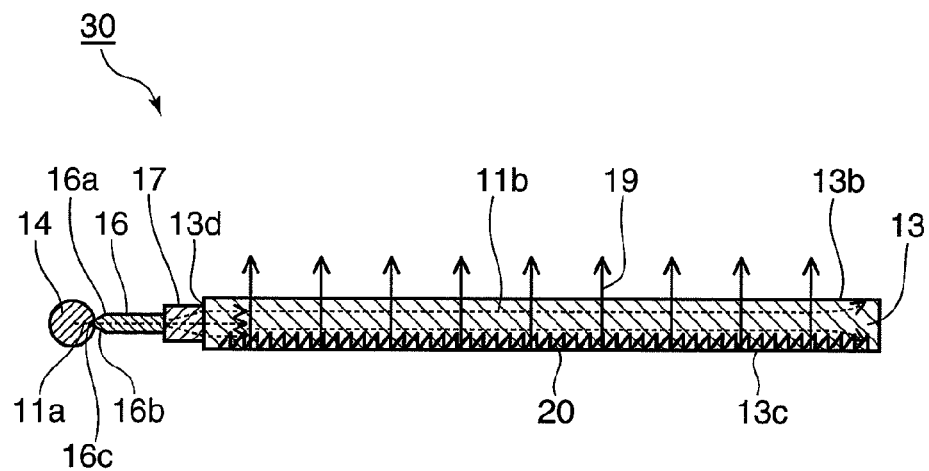
FIG. 9 is a section of the planar illumination device along 2B-2B of FIG. 8.

FIGS. 8 and 9 are schematic construction diagrams of a planar illumination device 30 according to a second embodiment of the present invention, wherein FIG. 8 is a plan view diagrammatically showing the entire construction of the planar illumination device 30 and FIG. 9 is a section of the planar illumination device 30 along 2B-2B of FIG. 8. Although the respective parts of the planar illumination device 30 are shown to be separated in order to facilitate the understanding of the respective constructions in FIG. 8, they are placed on or within an unillustrated base plate or a frame in an actual construction to be entirely and integrally fixed.

As shown in FIGS. 8 and 9, the planar illumination device 30 of this embodiment differs from the planar illumination device 10 of the first embodiment in that one principal surface 13b of a light guide plate 13 is enclosed by a pair of shorter sides 31a and a pair of longer sides 31b facing each other and connection side fibers 16 and fiber collimators 17 are optically connected with a side surface 13d extending along the shorter sides 31a out of side surfaces 13a, 13d of the light guide plate. Since laser light 11a is incident on the side surface 13d of the light guide plate 13 extending along the shorter sides 31a, it propagates along the longer sides 31b in the light guide plate 13.

By employing such a construction, the laser light 11a propagating in one direction along the direction of the longer sides 31b in the light guide plate 13 is emitted as output light 19 from the one principal surface 13b of the light guide plate 13. Similar to the planar illumination device 10 shown in FIG. 1, laser light 11a from a laser light source 11 can be transmitted to the light guide plate 13 without almost any loss by optical fibers (light source side bundle fiber 12, mixed fiber 18a, light guiding fiber 14 and connection side fibers 16), wherefore the laser light 11a can be efficiently utilized and the thin planar illumination device 30 operable with low power consumption can be realized.

Since a connecting structure for the light guiding fiber 14 and the connection side fibers 16 for causing the laser light 11a from the laser light source 11 to be incident on the light guide plate 13 is elaborated similar to the first embodiment, the laser light 11a accurately uniform in a direction along the side surface 13d can be incident on the side surface 13d. As a result, the output light 19 can be highly uniformly emitted from the one principal surface 13b of the light guide plate 13.

Further, since the laser light 11a is incident on the light guide plate 13 after being branched off into a multitude of beams by the plurality of connection side fibers 16 and is emitted as the output light 19 without phase alignment, speckle noise of the output light 19 can be sufficiently reduced.

(Third Embodiment)

Figure 10:
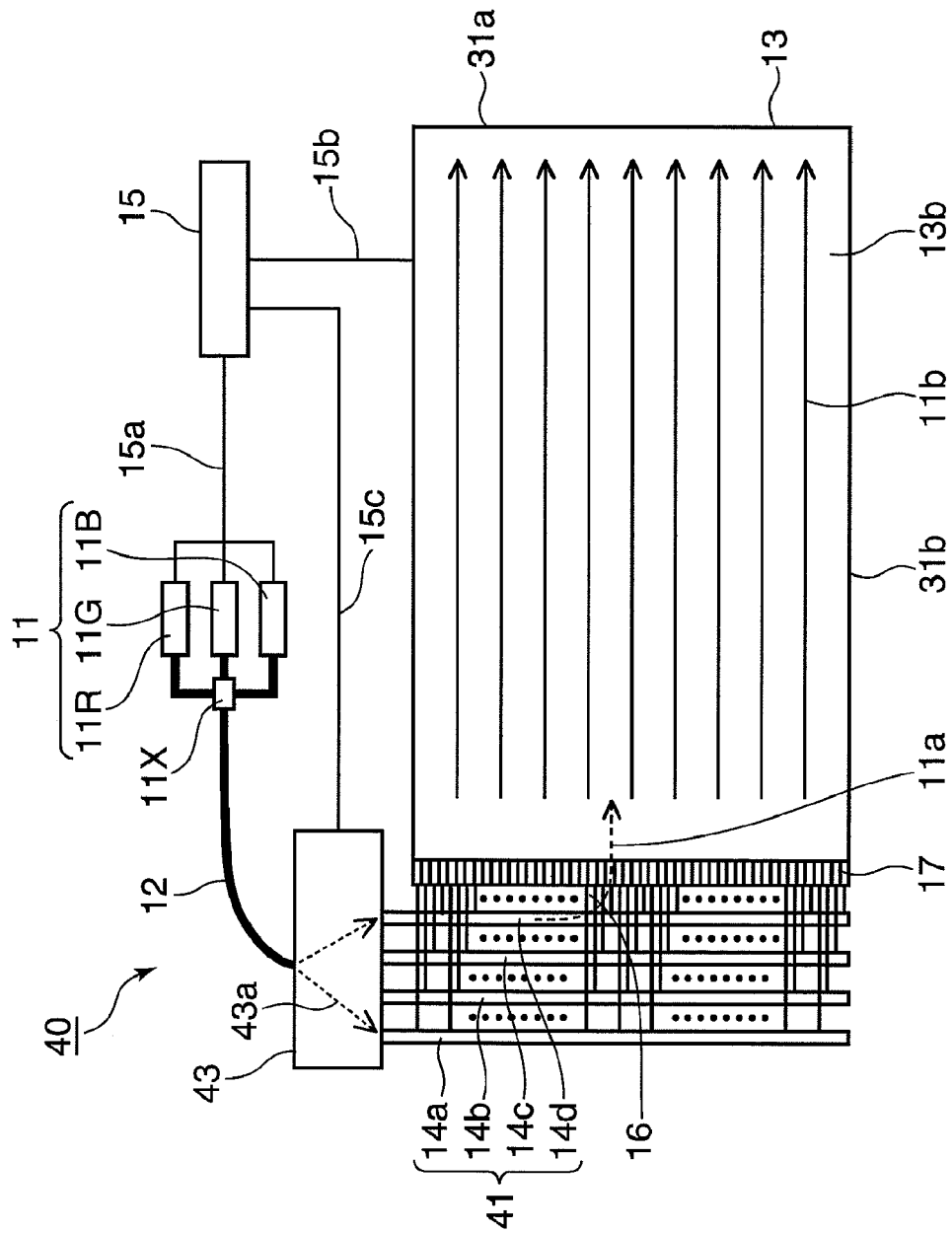
FIG. 10 is a plan view diagrammatically showing the entire construction of a planar illumination device according to a third embodiment of the invention.

FIG. 10 is a plan view showing a schematic construction of a planar illumination device 40 according to a third embodiment of the present invention. Although the respective parts of the planar illumination device 40 are shown to be separated in order to facilitate the understanding of the respective constructions also in FIG. 10, they are placed on or within an unillustrated base plate or a frame in an actual construction to be entirely and integrally fixed.

The planar illumination device 40 of this embodiment shown in FIG. 10 differs from the planar illumination devices 10, 30 of the first and second embodiments in the constructions of the laser light source 11, the light guiding fiber 14 and the connection side fibers 16. In other words, the light guiding fiber 14 is comprised of a plurality of branch light guiding fibers 14a, 14b, 14c and 14d and the planar illumination device 40 of this embodiment further includes an optical switch element 43 having the opposite sides thereof optically connected with the plurality of branch light guiding fibers 14a, 14b, 14c and 14d and the light source side bundle fiber 12.

The optical switch element 43 is, for example, a 1×4 optical switch element capable of outputting laser light 43a as one input from the light source side bundle fiber 12 to the four branch light guiding fibers 14a, 14b, 14c and 14d while branching it as shown in FIG. 10. In other words, the optical switch element 43 is electrically connected to a controller 15 via a wiring 15c, and the controller 15 controls a switching operation of the optical switch element 43 so that at least one of the plurality of branch light guiding fibers 14a, 14b, 14c and 14d is selected. In accordance with this control, the optical switch element 43 selects at least one of the plurality of branch light guiding fibers 14a, 14b, 14c and 14d and causes the laser light 43a incident from the light source side bundle fiber 12 to be incident only on the connection side fibers 16 connected with the selected branch light guiding fiber.

Here, a connection mode of the branch light guiding fibers 14a, 14b, 14c and 14d and the connection side fibers 16 is as follows. As shown in FIG. 10, the respective branch light guiding fibers 14a, 14b, 14c and 14d are connected in this order with the connection side fibers 16 from above. For example, the first, fifth, ninth, . . . connection side fibers 16 are connected with the branch light guiding fiber 14a from above; the second, sixth, tenth, . . . connection side fibers 16 are connected with the branch light guiding fiber 14b from above; the third, seventh, eleventh, . . . connection side fibers 16 are connected with the branch light guiding fiber 14c from above; and the fourth, eighth, twelfth, . . . connection side fibers 16 are connected with the branch light guiding fiber 14d from above.

For example, if the controller 15 controls the optical switch element 43 to select the branch light guiding fiber 14d, the optical switch element 43 causes the laser light 43a to be transmitted to the branch light guiding fiber 14d. Out of the connection side fibers 16 separately connected with the plurality of branch light guiding fibers 14a, 14b, 14c and 14d, the laser light 43a is incident only on the connection side fibers 16 connected with the selected branch light guiding fiber 14d.

The connection mode of the branch light guiding fibers 14a, 14b, 14c and 14d and the connection side fibers 16 is not particularly limited to the above example and various changes can be made. The number of branch light guiding fibers is also not particularly limited to the above example, various changes can be made.

By employing such a construction, the laser light 43a can be efficiently incident on the light guide plate 13 from the light guiding fiber 41 via the plurality of connection side fibers 16 without losing the light quantity thereof. Thus, the planar illumination device 40 capable of emitting accurately uniform output light (not shown) with low power consumption can be realized.

Further, the laser light 43a is caused to be selectively incident on the plurality of branch light guiding fibers 14a, 14b, 14c and 14d by the optical switch element 43 and the laser light 43a is further incident on the light guide plate 13 after being branched off into a multitude of beams by the plurality of connection side fibers 16 and is emitted as the output light without phase alignment. Thus, speckle noise of the output light can be sufficiently reduced. This reducing effect is exhibited because the speckle noise is averaged by the integration action of human eyes although it is switched within a short period of time.

Further, if an illumination area of the light guide plate 13 is divided into a plurality of divided areas and each divided area is allotted to each branch light guiding fiber, the illumination area of the light guide plate 13 can be successively scrolled. As a result, if the planar illumination device 40 is used as a scanning backlight of a liquid crystal TV, moving image blur can be reduced using backlight scanning technology for drastically reducing moving image blur by successively blinking parts of the backlight in synchronism with the insertion of a black image.

For example, the illumination area of the light guide plate 13 can be successively scrolled from above to below by dividing the connection side fibers 16 into first to fourth groups from an upper side of the light guide plate 13, connecting the connection side fibers 16 of the first group with the branch light guiding fiber 14a, connecting the connection side fibers 16 of the second group with the branch light guiding fiber 14b, connecting the connection side fibers 16 of the third group with the branch light guiding fiber 14c, connecting the connection side fibers 16 of the fourth group with the branch light guiding fiber 14d and causing the laser light 43a to be successively incident on the branch light guiding fibers 14a, 14b, 14c and 14d by means of the optical switch element 43.

(Fourth Embodiment)

Figure 11:
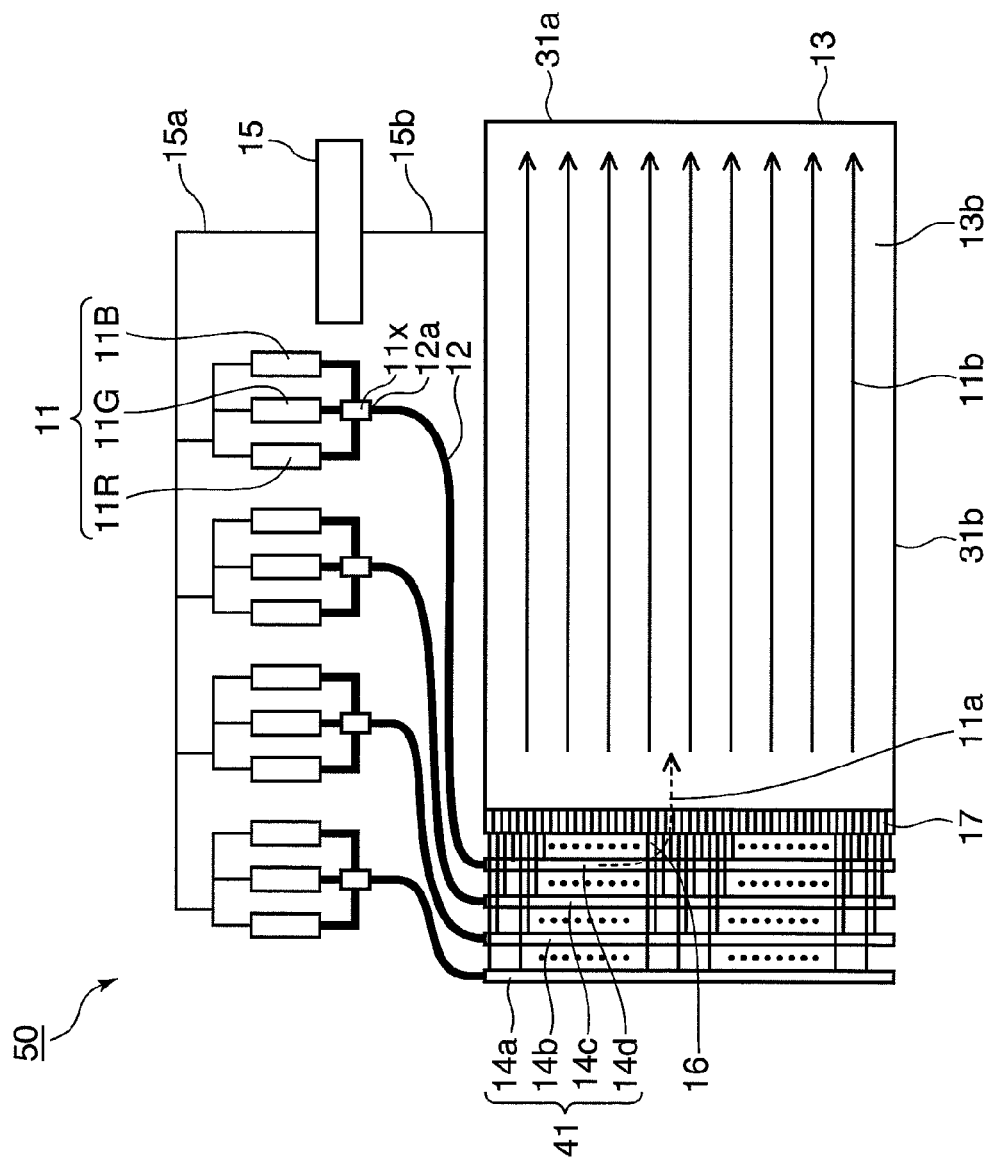
FIG. 11 is a plan view diagrammatically showing the entire construction of a planar illumination device according to a fourth embodiment of the invention.

FIG. 11 is a plan view showing a schematic construction of a planar illumination device 50 according to a fourth embodiment of the present invention. Although the respective parts of the planar illumination device 50 are shown to be separated in order to facilitate the understanding of the respective constructions also in FIG. 11, they are placed on or within an unillustrated base plate or a frame in an actual construction to be entirely and integrally fixed.

In the planar illumination device 50 shown in FIG. 11, a light guiding fiber 41 is comprised of a plurality of branch light guiding fibers 14a, 14b, 14c and 14d, a plurality of laser light source 11 and a plurality of light source side bundle fibers 12 optically connected with the plurality of branch light guiding fibers 14a, 14b, 14c and 14d are further provided, and laser light is incident on the respective branch light guiding fibers 14a, 14b, 14c and 14d from different laser light sources 11 and light source side bundle fibers 12.

A controller 15 controls the operation of the plurality of laser light sources 11 and the plurality of light source side bundle fibers 12. By selecting the laser light source 11 and the light source side bundle fiber 12 to be operated by the controller 15, laser light is emitted from the selected laser light source 11 and light source side bundle fiber 12. Connection side fibers 16 are separately connected with the plurality of branch light guiding fibers 14a, 14b, 14c and 14d and laser light 11a is incident only on the connection side fibers 16 connected with the branch light guiding fiber connected with the selected laser light source 11 and light source side bundle fiber 12.

By employing such a construction, the planar illumination device 50 capable of emitting accurately uniform output light (not shown) with low power consumption can be realized, and the plurality of laser light sources 11 can be alternately and efficiently operated to have long lives. Further, if an illumination area of the light guide plate 13 is divided into a plurality of divided areas and each divided area is allotted to each laser light source 11 and each light source side bundle fiber 12, the illumination area of the light guide plate 13 can be successively scrolled. As a result, if the planar illumination device 50 is used as a scanning backlight of a liquid crystal TV, moving image blur can be reduced.

Further, since the laser light 11a is incident on the light guide plate 13 after being branched off into a multitude of beams by the plurality of connection side fibers 16 and is emitted as output light without phase alignment, speckle noise of the output light can be sufficiently reduced. This reducing effect is exhibited because the speckle noise is averaged by the integration action of human eyes although it is switched within a short period of time.

(Fifth Embodiment)

Figure 12:
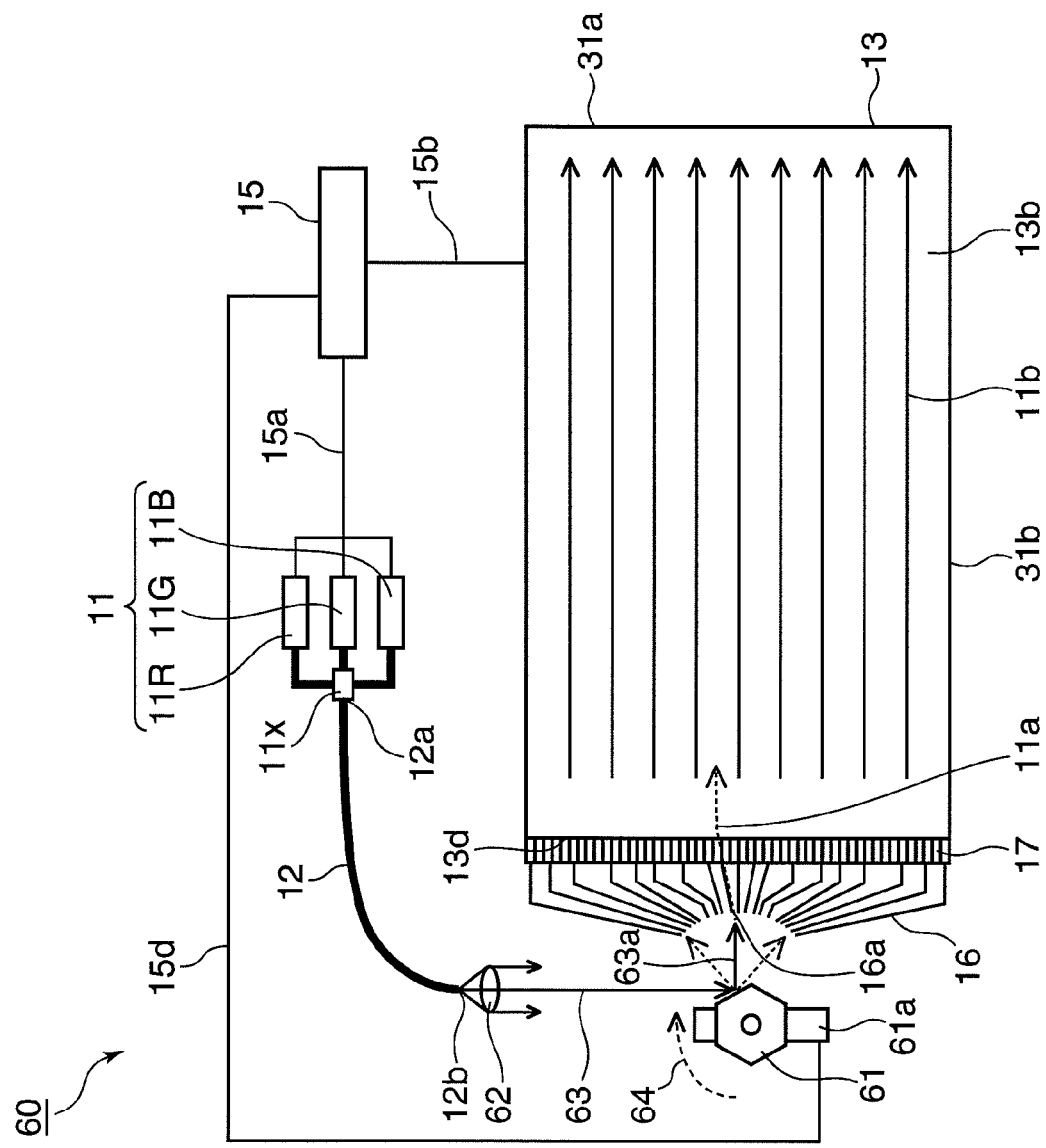
FIG. 12 is a plan view diagrammatically showing the entire construction of a planar illumination device according to a fifth embodiment of the invention.

FIG. 12 is a plan view showing a schematic construction of a planar illumination device 60 according to a fifth embodiment of the present invention. Although the respective parts of the planar illumination device 60 are shown to be separated in order to facilitate the understanding of the respective constructions also in FIG. 12, they are placed on or within an unillustrated base plate or a frame in an actual construction to be entirely and integrally fixed.

The planar illumination device 60 of this embodiment shown in FIG. 12 is provided with a laser light source 11, a light source side bundle fiber 12 having one end surface 12a thereof optically connected with the laser light source 11, a plurality of connection side fibers 16 having one ends 16a arranged in an arcuate manner and the other ends planarly arranged in parallel with each other, a plurality of fiber collimators 17 planarly arranged in parallel with each other in correspondence with the plurality of connection side fibers 16, a light guide plate 13 having the plurality of connection side fibers 16 optically connected with a side surface 13d via the plurality of fiber collimators 17, a polygon mirror 61 optically connecting the light source side bundle fiber 12 and the connection side fibers 16 and a controller 15 for controlling at least the laser light source 11 and the polygon mirror 61.

Although the plurality of connection side fibers 16 are arranged at intervals in the planar illumination device 60 of FIG. 12 to facilitate the understanding of the construction, they are densely arranged in correspondence with the individual fiber collimators 17 in an actual construction. Laser light (not shown) emitted from the laser light source 11 is emitted from the light source side bundle fiber 12 and emitted as parallel laser light 63 by a collimator lens 62. The laser light 63 is incident on the polygon mirror 61 to be scanned as scanning light beams 63a, which are successively incident on the one ends 16a of the plurality of connection side fibers 16.

Further, as shown in FIG. 12, the one ends 16a of the plurality of connection side fibers 16 are successively arranged at a specified distance from the polygon mirror 61. The polygon mirror 61 operates to scan the successively arranged one ends 16a with the scanning light beams 63a at a specified scanning speed.

Although not shown here, collimators having a diameter corresponding to the beam diameter of the scanning light beams 63a are connected with the one ends 16a of the connection side fibers 16. Since the polygon mirror 61 is rotated in a direction of an arrow 64 by being driven by a driver 61a electrically connected with the controller 15 via a wiring 15d, the laser light 11a can be incident on the light guide plate 13 to scan from above to below.

Instead of the collimator lens 62, a fiber collimator (not shown) or the like may be connected with an emergent end 12b of the light source side bundle fiber 12 for emitting the laser light 63 so that the parallel laser light 63 having a diameter substantially corresponding to the diameter of the light source side bundle fiber 12 can be emitted. In this way, the laser light 63 is scanned by the polygon mirror 61 and can be successively incident on the connection side fibers 16 as the scanning light beams 63a without almost any loss.

By employing such a construction, the laser light 11a can be efficiently incident on the light guide plate 13 via the plurality of connection side fibers 16 by effectively utilizing the space and scanning the laser light 63. Thus, the planar illumination device 60 capable of emitting accurately uniform output light (not shown) with low power consumption can be realized. Further, since a multitude of branched-off scanning light beams 63a are incident on the light guide plate 13 via the plurality of connection side fibers 16 to emit output light without phase alignment, speckle noise of the output light can be sufficiently reduced. This reducing effect is exhibited because the speckle noise is averaged by the integration action of human eyes although it is switched within a short period of time. Further, the light guide plate 13 is scanned from above to below with the laser light 11a by the polygon mirror 61 to successively scroll an illumination area of the light guide plate 13, whereby moving image blur can be reduced if the planar illumination device 60 is used as a scanning backlight of a liquid crystal TV.

(Sixth Embodiment)

Figure 13:
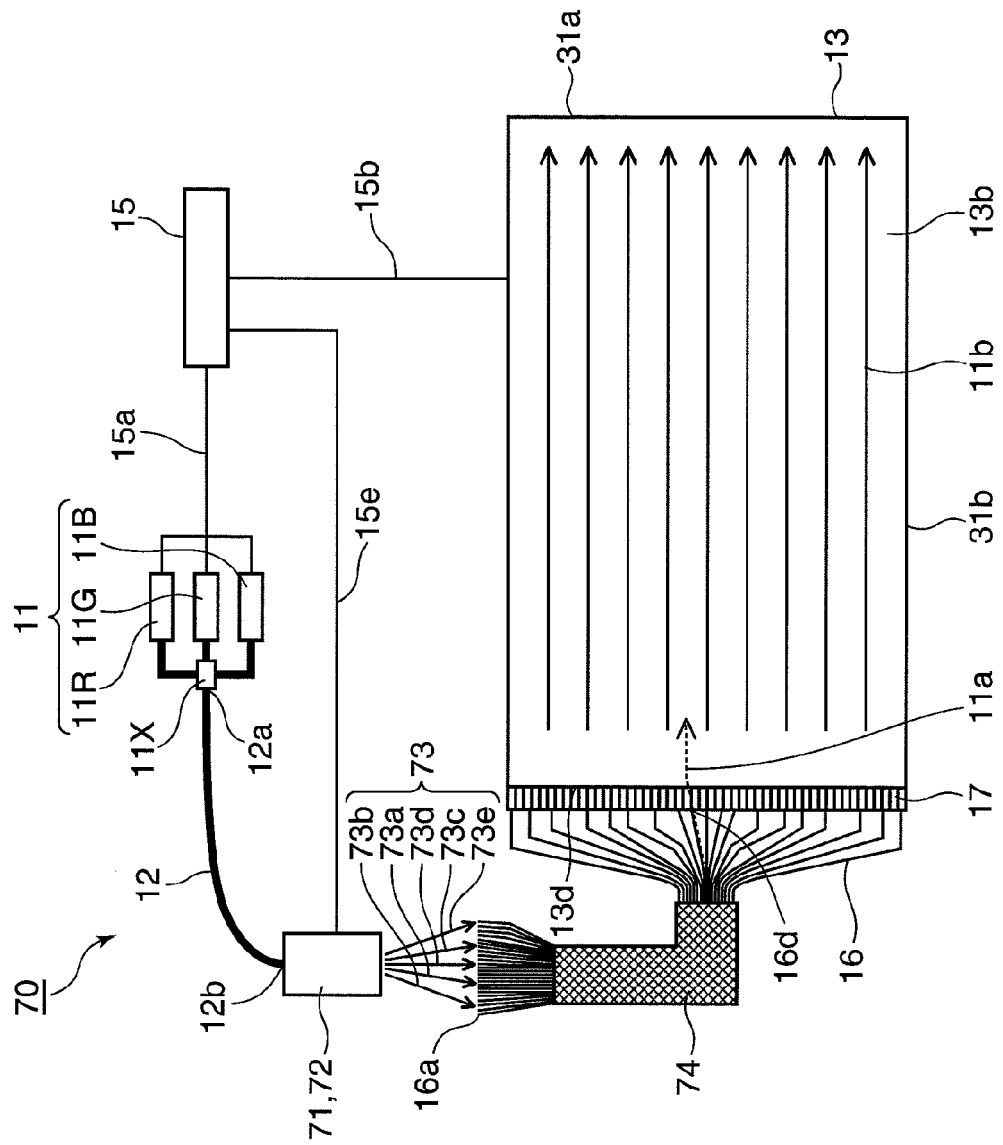
FIG. 13 is a plan view diagrammatically showing the entire construction of a planar illumination device according to a sixth embodiment of the invention.

FIG. 13 is a plan view showing a schematic construction of a planar illumination device 70 according to a sixth embodiment of the present invention. Although the respective parts of the planar illumination device 70 are shown to be separated in order to facilitate the understanding of the respective constructions also in FIG. 13, they are placed on or within an unillustrated base plate or a frame in an actual construction to be entirely and integrally fixed.

The planar illumination device 70 of this embodiment shown in FIG. 13 is provided with a laser light source 11, a light source side bundle fiber 12 having one end surface 12a thereof optically connected with the laser light source 11, a plurality of connection side fibers 16 having emergent ends 16d planarly arranged in parallel with each other, a plurality of fiber collimators 17 planarly arranged in parallel with each other in correspondence with the plurality of connection side fibers 16, a light guide plate 13 having a side surface 13d optically connected with the plurality of connection side fibers 16 via the plurality of fiber collimators 17, an acoustooptic element 71 (or electrooptic element 72) capable of optically connecting the light source side bundle fiber 12 and the plurality of connection side fibers 16 and randomly scanning laser light and a controller 15 for controlling at least the acoustooptic element 71 (or electrooptic element 72) and the laser light source 11.

Although the plurality of connection side fibers 16 are arranged at intervals in the planar illumination device 70 of FIG. 13 to facilitate the understanding of the construction, they are densely arranged in correspondence with the individual fiber collimators 17 in an actual construction.

Laser light (not shown) emitted from the laser light source 11 is scanned as scanning light beams 73 (73a, 73b, 73c and 73d) by the acoustooptic element 71 (or electrooptic element 72) connected with the emergent end 12b of the light source side bundle fiber 12 as shown in FIG. 13. The scanning light beams 73 (73a, 73b, 73c and 73d) are successively incident on one ends 16a of ones of the plurality of connection side fibers 16 selected by the controller 15.

At this time, intermediate parts of the plurality of connection side fibers 16 are bundled by a covering portion 74. The scanning light beams are incident on the one ends 16a of the plurality of connection side fibers 16 and the laser light 11a emerging from the emergent ends 16d of the plurality of connection side fibers 16 is incident on the light guide plate 13 via the fiber collimators 17. The acoustooptic element 71 or the electrooptic element 72 is connected with the controller 15 via a wiring 15e to be controlled.

By employing such a construction, the laser light 11a can be uniformly incident on the light guide plate 13 from the plurality of connection side fibers 16 and a planar illumination device capable of emitting accurately uniform output light with low power consumption can be realized.

At this time, even if the one ends 16a of the plurality of connection side fibers 16 as the incident sides and the emergent ends 16d thereof are not arranged in the same order, it can be controlled at which position of the side surface 13d and in which order the laser light as incident light is incident by controlling the scanning of the scanning light beams 73 by the acoustooptic element 71 or the electrooptic element 72 if these arrangement orders are grasped by the controller 15. Thus, a plurality of optical fibers constituting the connection side fibers 16 need not be aligned, wherefore extra member and adjustment for alignment can be omitted and an effect of being able to use a low-cost connection side bundle fiber as the connection side fibers 16 can be obtained.

Further, since the laser light 11a is incident on the light guide plate 13 after being branched off into a multitude of beams by the plurality of connection side fibers 16 and is emitted as the output light 19 without phase alignment, speckle noise of the output light 19 can be sufficiently reduced. This reducing effect is exhibited because the speckle noise is averaged by the integration action of human eyes although it is switched within a short period of time.

Further, the laser light 73 is scanned by the acoustooptic element 71 or the electrooptic element 72 to successively scroll an illumination area of the light guide plate 13, whereby moving image blur can be reduced if the planar illumination device 70 is used as a scanning backlight of a liquid crystal TV.

(Seventh Embodiment)

Figure 14:
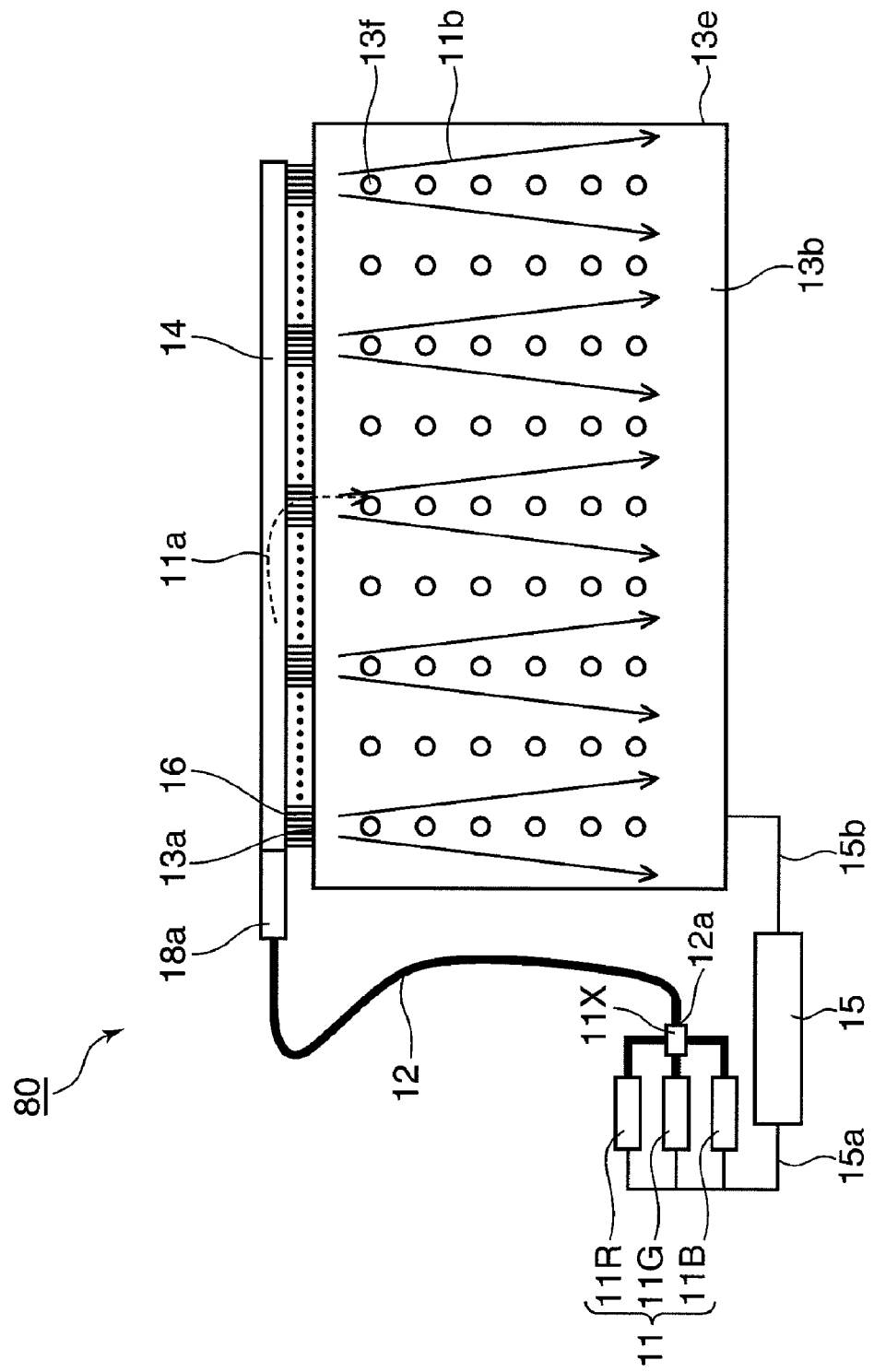
FIG. 14 is a plan view diagrammatically showing the entire construction of a planar illumination device according to a seventh embodiment of the invention.

FIG. 14 is a plan view showing a schematic construction of a planar illumination device 80 according to a seventh embodiment of the present invention. Although the respective parts of the planar illumination device 80 are shown to be separated in order to facilitate the understanding of the respective constructions also in FIG. 14, they are placed on or within an unillustrated base plate or a frame in an actual construction to be entirely and integrally fixed.

The planar illumination device 80 shown in FIG. 14 differs from the planar illumination device 10 shown in FIG. 1 in that the fiber collimators 17 are omitted, and laser light 11a is directly incident on a side surface 13a of a light guide plate 13e from connection side fibers 16, diffused by diffusing particles 13f in the light guide plate 13e and emitted from one principal surface 13b of the light guide plate 13e. Since other points are the same as in the planar illumination device 10 shown in FIG. 1, no detailed description is given thereon.

In the planar illumination device 80 shown in FIG. 14, a plurality of connection side fibers 16 respectively include tapered contact portions 16b at one ends 16a thereof, and a light guiding fiber 14 is optically connected with the plurality of connection side fibers 16 at contact parts 16c at the leading ends of the contact portions 16b. Laser light 11a is incident on the plurality of connection side fibers 16 after passing the contact parts 16c from the light guiding fiber 14 and guided into the light guide plate 13e from the plurality of connection side fibers 16 while spreading. A plurality of diffusing particles 13f are distributed and mixed in the light guide plate 13e and reflection films for reflecting the laser light 11a are formed on side surfaces of the light guide plate 13e excluding the other principal surface facing the one principal surface 13b and the side surface 13a.

Since the laser light 11a propagates in the light guide plate 13e while spreading in this embodiment, it is more efficiently scattered by the plurality of diffusing particles 13f, thereby being uniformly emitted as output light 19 from the one principal surface 13b of the light guide plate 13e.

By employing such a construction, the laser light 11a from the laser light source 11 can be directly transmitted to the light guide plate 13e without almost any loss by optical fibers (light source side bundle fiber 12, mixed fiber 18a, light guiding fiber 14 and connection side fibers 16), wherefore the laser light 11a can be efficiently utilized and the thin planar illumination device 80 operable with low power consumption can be realized.

Further, since the laser light 11a is incident on the light guide plate 13e after being branched off into a multitude of beams by the plurality of connection side fibers 16, scattered by the diffusing particles 13f and emitted as output light without phase alignment, speckle noise of the output light can be sufficiently reduced.

Furthermore, since a connecting structure for the light guiding fiber 14 and the connection side fibers 16 for causing the laser light 11a from the laser light source 11 to be incident on the light guide plate 13e is elaborated similar to the first embodiment, the laser light 11a accurately uniform in a direction along the side surface 13a can be incident on the side surface 13a. As a result, the output light can be highly uniformly emitted from the one principal surface 13b of the light guide plate 13e.

(Eighth Embodiment)

Figure 15:
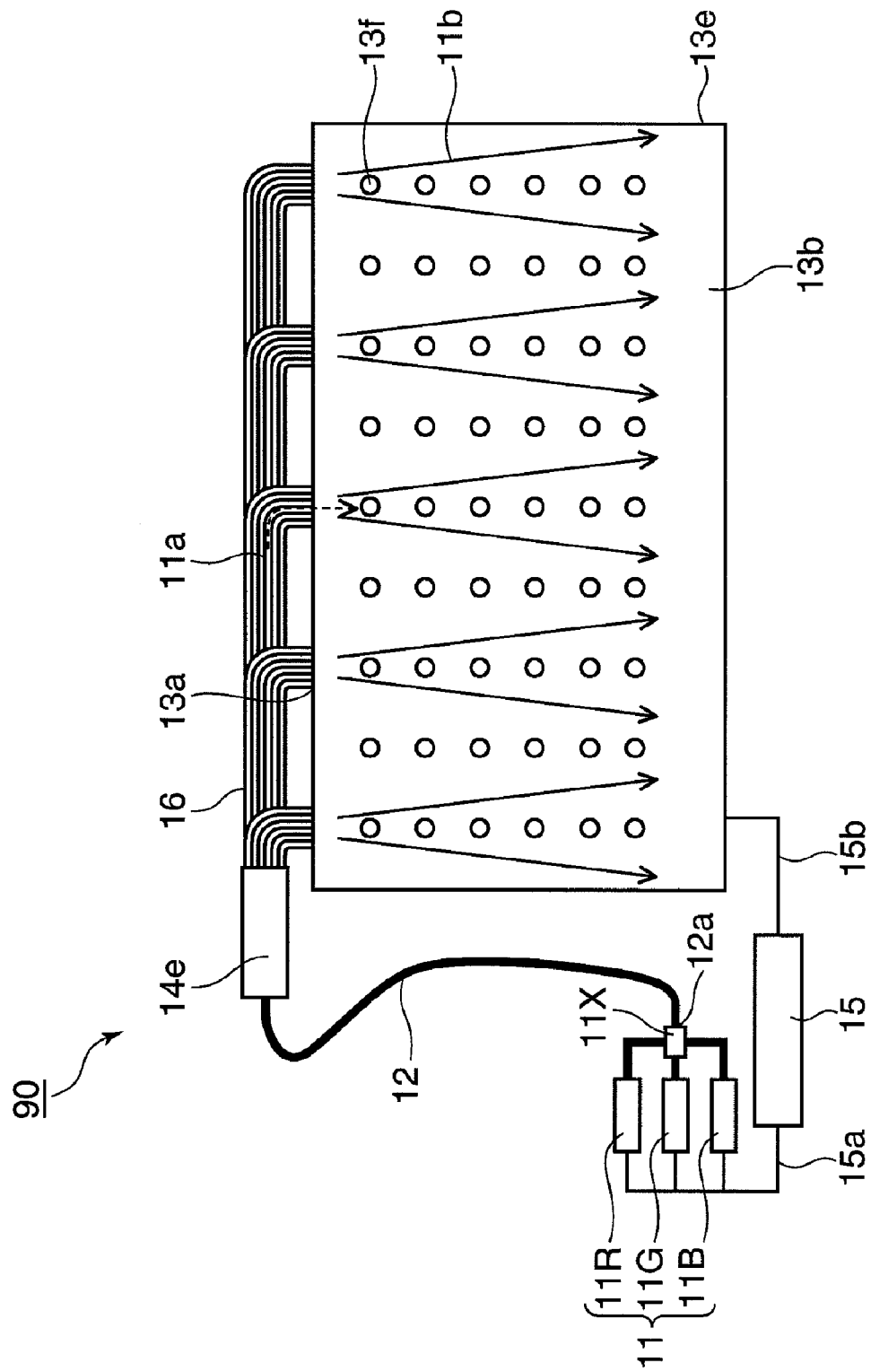
FIG. 15 is a plan view diagrammatically showing the entire construction of a planar illumination device according to an eighth embodiment of the invention.

FIG. 15 is a plan view showing a schematic construction of a planar illumination device 90 according to an eighth embodiment of the present invention. Although the respective parts of the planar illumination device 90 are shown to be separated in order to facilitate the understanding of the respective constructions also in FIG. 15, they are placed on or within an unillustrated base plate or a frame in an actual construction to be entirely and integrally fixed.

The planar illumination device 90 shown in FIG. 15 differs from the planar illumination device 10 shown in FIG. 1 in that the light guiding fiber 14, the fiber collimators 17 and the mixed fiber 18a are omitted, the light source side bundle fiber 12 and the connection side fibers 16 are optically connected via a light pipe 14e and laser light 11a is directly incident on a side surface 13a of a light guide plate 13e from the connection side fibers 16, diffused by diffusing particles 13f in the light guide plate 13e and emitted from one principal surface 13b of the light guide plate 13e. Since other points are the same as in the planar illumination device 10 shown in FIG. 1, no detailed description is given thereon.

In the planar illumination device 90 shown in FIG. 15, the light pipe 14e is made of a rectangular parallelepipedic solid glass and laser light from the light source side bundle fiber 12 is incident on the plurality of connection side fibers 16 with the laser light of the respective wavelengths uniformly mixed while repeating total reflections in the light pipe 14e. The construction of the light pipe is not particularly limited to the above example, a light pipe having another shape such as cylindrical shape, a hollow light pipe formed by reflecting mirrors at four sides or the like may be used. Further, instead of the light pipe, a large-diameter fiber having a core diameter of from several hundreds μm to several mm may be used.

The plurality of connection side fibers 16 are formed, for example, by cylindrical optical fibers and the laser light 11a is guided into the light guide plate 13e from the plurality of connection side fibers 16 while spreading. A plurality of diffusing particles 13f are distributed and mixed in the light guide plate 13e and reflection films for reflecting the laser light 11a are formed on side surfaces of the light guide plate 13e excluding the other principal surface facing the one principal surface 13b and the side surface 13a.

Since the laser light 11a propagates in the light guide plate 13e while spreading also in this embodiment, it is more efficiently scattered by the plurality of diffusing particles 13f, thereby being uniformly emitted as output light 19 from the one principal surface 13b of the light guide plate 13e.

By employing such a construction, the laser light 11a from the laser light source 11 is transmitted from the light source side bundle fiber 12 to the plurality of connection side fibers 16 via the light pipe 14e, thereby being directly transmitted to the light guide plate 13 without almost any loss. Thus, the laser light 11a can be efficiently utilized, the thin planar illumination device 90 operable with low power consumption can be realized and output light can be highly uniformly emitted from the one principal surface 13b of the light guide plate 13e.

Further, since the laser light 11a is incident on the light guide plate 13 after being branched off into a multitude of beams by the plurality of connection side fibers 16, scattered by the diffusing particles 13f and emitted as output light without phase alignment, speckle noise of the output light can be sufficiently reduced and the output light can be highly uniformly emitted from the one principal surface 13b of the light guide plate 13e.

(Ninth Embodiment)

Figure 16:
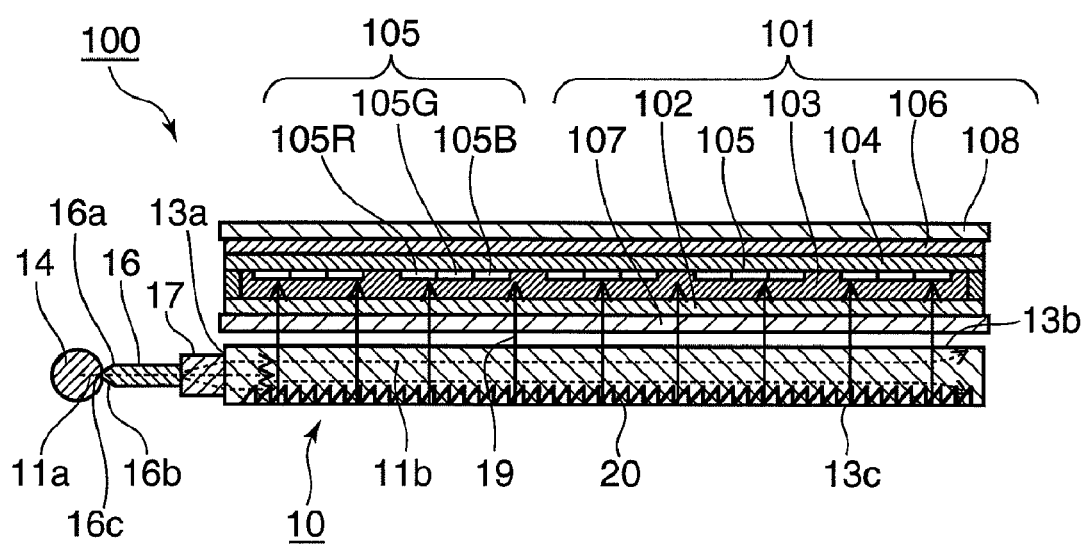
FIG. 16 is a plan view diagrammatically showing the entire construction of a liquid crystal display device according to a ninth embodiment of the invention.

FIG. 16 is a schematic section showing a liquid crystal display device according to a ninth embodiment of the present invention using the planar illumination device according to any one of the first to eighth embodiments as a backlight illumination device. Here, a liquid crystal display device 100 using the planar illumination device 10 is, for example, described.

As shown in FIG. 16, the liquid crystal display device 100 of this embodiment is provided with a liquid crystal display panel 101 and the planar illumination device 10 as a backlight illumination device for illuminating this liquid crystal display panel 101 from behind.

Here, the liquid crystal display panel 101 is of the transmissive or semi-transmissive type and has a TFT active matrix construction, and a multitude of pixels 105 each comprised of a red pixel section (R subpixel) 105R, a green pixel section (G subpixel) 105G and a blue pixel section (B subpixel) 105B are provided in a display region as shown in FIG. 16 and driven by a TFT.

A liquid crystal layer 103 is provided between two glass substrates 102 and 104. The TFT for driving this liquid crystal layer 103 is formed on one of the glass substrates 102 and 104, but not shown. Identified by 106 is an emergent side polarizing film and by 107 an incident side polarizing film. Since this liquid crystal display panel 101 has a conventionally used construction, the construction thereof is not further described.

Output light 19 emitted from the one principal surface 13b of the light guide plate 13 of the planar illumination device 10 (backlight illumination device) is combined light of R light, G light and B light. Further, the output light 19 having passed through the incident side polarizing film 107 of the liquid crystal display panel 101 becomes linearly polarized light, and the liquid crystal layer 103 is driven by the TFT to switch a polarization plane of the output light 19, thereby switching light to be emitted from the pixels 105. At this time, by synchronously operating the pixels 105 by the TFT in accordance with the scanning of the output light 19, a desired image can be displayed.

Accordingly, by employing such a construction, the liquid crystal display device 100 with a wide color reproduction range, high luminance and high image quality can be realized. Further, since the emission efficiency of the laser light source 11 is high, power consumption can be reduced. Further, if the polarization plane of laser light is maintained using the laser light source 11 for emitting linearly polarized laser light and a polarization maintaining optical fiber, the incident side polarizing film 107 at a side toward the planar illumination device 10 can be dispensed with. Therefore, a cost reduction can be promoted and light utilization efficiency can be drastically improved.

In the liquid crystal display device 100 of FIG. 16, a diffusing plate 108 is provided adjacent to the emergent side polarizing film 106 of the liquid crystal display panel 101 to widen a display viewing angle by diffusing the output light 19. The diffusing plate 108 is preferably a diffusing plate with large forward light scattering and small backward light scattering. Since this enables laser light to be scattered while being widely spread in a forward direction by the diffusing plate 108, a display viewing angle becomes larger and an image can be visually confirmed in an oblique direction from a surrounding area. Therefore, the image display quality of the liquid crystal display device 100 can be improved.

For the enlargement of the viewing angle, an array of microlenses at least corresponding to the pixels may be provided immediate after and near an array of pixels or adjacent to the polarizing film of the liquid crystal display panel 101. In this way, laser light propagating straight from the one principal surface 13b of the light guide plate 13 and emitted after being controlled by the pixels 105 of the liquid crystal display panel 101 can be diffused in all directions by the microlenses, wherefore the viewing angle of the image display can be enlarged.

The present invention is summarized as follows from the above respective embodiments. Specifically, a planar illumination device according to the present invention comprises a laser light source for emitting laser light; a light source side bundle fiber having one end surface thereof optically connected with the laser light source; a flat light guide plate; a plurality of connection side fibers planarly arranged in parallel with each other at a side surface of the light guide plate; and a light guiding member for guiding the laser light from the light source side bundle fiber to the plurality of connection side fibers, wherein the laser light is incident on the side surface of the light guide plate from the plurality of connection side fibers and output light is uniformly emitted from one principal surface of the light guide plate.

In this planar illumination device, the laser light from the laser light source is transmitted to the light guide plate without almost any loss via the light source side bundle fiber, the light guiding member and the plurality of connection side fibers, incident on the light guide plate after being branched off into a multitude of beams by the plurality of connection side fibers and emitted as the output light. Thus, speckle noise of the output light can be reduced and the accurately uniform output light can be emitted with low power consumption.

It is preferable that the laser light source includes at least a red laser light source, a green laser light source and a blue laser light source; and that the red, green and blue laser light sources emit laser lights to be incident on the one end surface of the light source side bundle fiber.

In this case, if the planar illumination device is used as backlight illumination device of a liquid crystal display device, a wide color reproduction range and high image quality can be obtained.

It is preferable that the light source side bundle fiber includes a plurality of optical fibers; and that the plurality of optical fibers are axially symmetrically bundled for the respective colors.

In this case, it is possible to mix laser light of the respective colors from the light source side bundle fiber and obtain white light with good angle distribution and in-plane uniformity of emitted light quantity.

It is preferable that the red laser light source is a semiconductor laser; that the light source side bundle fiber includes a plurality of optical fibers having different core diameters; and the core diameter of the optical fiber, on which laser light emitted from the red laser light source is incident, is larger than the core diameters of the optical fibers, on which laser lights emitted from the other laser light sources are incident.

In this case, the optical fibers having core diameters suitable for the respective laser light sources can be bundled using a high-power red semiconductor laser with wide stripes having a large width of 150 µm and a blue semiconductor laser and a green laser light source with small emission regions. Thus, the diameter of the light source side bundle fiber can be reduced without impairing the coupling efficiency of the respective laser light sources and the respective optical fibers.

The light source side bundle fiber preferably includes a plurality of optical fibers for guiding red laser light from the red laser light source, a plurality of optical fibers for guiding blue laser light from the blue laser light source and one optical fiber for guiding green laser light from the green laser light source.

In this case, high-power white illumination can be obtained with a small construction using a plurality of red semiconductor lasers and a plurality of blue semiconductor lasers and one green laser light source using SHG light of laser light emitted from a semiconductor laser excitation solid state layer.

It is preferable that the above planar illumination device further comprises a plurality of fiber collimators arranged in parallel with each other in conformity with the plurality of connection side fibers and optically connected with the side surface of the light guide plate; that the light guiding member includes a light guiding fiber arranged to face the side surface of the light guide plate and adapted to optically connect the light source side bundle fiber and the connection side fibers and emit the laser light from the light source side bundle fiber to the plurality of connection side fibers while distributing it; and that the laser light from the plurality of connection side fibers is incident on the side surface of the light guide plate via the plurality of fiber collimators and output light is uniformly emitted from the one principal surface.

In this case, since the laser light from the laser light source can be transmitted to the light guide plate without almost any loss by the light source side bundle fiber, the light guiding fiber, the connection side fibers and the fiber collimators, the laser light can be efficiently utilized and a thin planar illumination device operable with low power consumption can be realized. Further, since the laser light is incident on the light guide plate after being branched off into a multitude of beams by the plurality of connection side fibers and emitted as output light without phase alignment, speckle noise of the output light can be sufficiently reduced. For example, it is also possible to obtain white illumination by using laser light sources of three colors of RGB as the laser light source and a higher output can be obtained using a plurality of laser light sources of the same color. If the above are combined and a plurality of laser light sources of three primary colors are used, high-power and bright white illumination can be obtained.

It is preferable that each of the plurality of connection side fibers includes a tapered contact portion at one end thereof that the light guiding fiber is optically connected with the plurality of connection side fibers at contact parts at the leading ends of the contact portions; and that the laser light passes through the contact parts from the light guiding fiber to be incident on the plurality of connection side fibers and guided to the light guide plate.

In this case, since the laser light accurately uniform in a direction along the side surface of the light guide plate can be incident on this side surface, the laser light can be efficiently incident on the light guide plate via the plurality of connection side fibers from the light guiding fiber without losing the light quantity thereof. Thus, a low power consuming planar illumination device capable of emitting accurately uniform output light can be realized. Further, since the laser light is incident on the light guide plate after being branched off into a multitude of beams by the plurality of connection side fibers and emitted as output light without phase alignment, speckle noise of the output light can be sufficiently reduced.

It is preferable that the light guiding fiber includes a plurality of branch light guiding fibers; that the planar illumination device further comprises an optical switch element having the opposite sides thereof optically connected with the plurality of branch light guiding fibers and the light source side bundle fiber and a controller for controlling the optical switch element; that the optical switch element causes the laser light to be incident only on the connection side fibers connected with the selected branch light guiding fiber by selecting at least one of the plurality of branch light guiding fibers and emitting the laser light incident from the light source side bundle fiber to the selected branch light guiding fiber.

In this case, the laser light can be efficiently incident on the light guide plate from the plurality of branch light guiding fibers via the plurality of connection side fibers without losing the light quantity thereof. Thus, a low power consuming planar illumination device capable of emitting accurately uniform output light can be realized. Further, since the laser light is incident on the light guide plate after being branched off into a multitude of beams by the plurality of connection side fibers and emitted as output light without phase alignment, speckle noise of the output light can be sufficiently reduced. This reducing effect is exhibited because the speckle noise is averaged by the integration action of human eyes although it is switched within a short period of time. Further, by successively scrolling an illumination area of the light guide plate, moving image blur can be reduced if the planar illumination device is used as a scanning backlight of a liquid crystal TV.

It is preferable that the light guiding fiber includes a plurality of branch light guiding fibers; that the laser light source and the light source side bundle fiber include a plurality of pairs of light source side bundle fibers and the laser light sources optically connected with the plurality of branch light guiding fibers; and that the planar illumination device further comprises a controller for selecting at least one of the plurality of pairs of the light source side bundle fibers and the laser light sources for operation and controls the plurality of pairs of the light source side bundle fibers and the laser light sources so that the laser light is incident only on the connection side fibers connected with the branch light guiding fiber connected with the selected light source side bundle fiber.

In this case, a plurality of laser light sources can be efficiently operated while having long lives. If regions for illuminating the light guide plate by the plurality of pairs of the light source side bundle fibers and the laser light sources are allotted, scroll illumination and scanning backlight can also be applied.

It is preferable that a plurality of fiber collimators arranged in parallel with each other in conformity with the plurality of connection side fibers and optically connected with the side surface of the light guide plate is further provided; that the light guiding member includes a polygon mirror for scanning the laser light from the light source side bundle fiber so that scanning light beams are successively incident on one ends of the plurality of connection side fibers; and that the laser light from the plurality of connection side fibers is incident on the side surface of the light guide plate via the plurality of fiber collimators and output light is uniformly emitted from one principal surface.

In this case, the laser light can be efficiently incident on the light guide plate via the plurality of connection side fibers by effectively utilizing space and scanning the laser light. Thus, a low power consuming planar illumination device capable of emitting accurately uniform output light can be realized. Further, since the laser light is incident on the light guide plate after being branched off into a multitude of beams by the plurality of connection side fibers and emitted as output light without phase alignment, speckle noise of the output light can be sufficiently reduced. This reducing effect is exhibited because the speckle noise is averaged by the integration action of human eyes although it is switched within a short period of time. Further, by successively scrolling an illumination area of the light guide plate, moving image blur can be reduced if the planar illumination device is used as a scanning backlight of a liquid crystal TV.

It is preferable that the one ends of the plurality of connection side fibers are successively arranged at a specified distance from the polygon mirror; and that polygon mirror scans the laser light such that the scanning light beams scan the one ends at a specified scanning speed.

In this case, even if the polygon mirror is rotated at a constant angular speed, the connection side fibers are scanned with the light at the constant speed, wherefore the uniformity of the output light emitted from the light guide plate on the one principal surface is further improved.

It is preferable that the light guiding member includes an optical scanning member for randomly scanning the laser light from the light source side bundle fiber so that scanning light beams are randomly incident on one ends of the plurality of connection side fibers; that the planar illumination device further comprises a controller for controlling the optical scanning member and a plurality of fiber collimators arranged in parallel with each other in conformity with the plurality of connection side fibers and optically connected with the side surface of the light guide plate; that the controller controls the optical scanning member such that the scanning light beams are successively incident on the one ends of the selected ones of the plurality of connection side fibers; and that the laser light from the selected connection side fiber is incident on the light guide plate via the fiber collimator.

In this case, the laser light can be uniformly incident on the side surface of the light guide plate from the plurality of connection side fibers and a low power consuming planar illumination device capable of emitting accurately uniform output light can be realized. Further, since the laser light is incident on the light guide plate after being branched off into a multitude of beams by the plurality of connection side fibers and emitted as output light without phase alignment, speckle noise of the output light can be sufficiently reduced. In addition, since light can be randomly scanned, an effect of being able to arbitrarily illuminate the plurality of connection side fibers can be obtained. For example, an acoustooptic element or an electrooptic element can be suitably used as the light scanning member capable of random scanning.

It is preferable that the one principal surface of the light guide plate is surrounded by a pair of shorter sides and a pair of longer sides facing each other; that the fiber collimators are optically connected with one of side surfaces of the light guide plate extending along the shorter sides; and that the laser light propagates in the light guide plate along the longer sides.

In this case, output light emitted from the one principal surface of the light guide plate can propagate along the longer sides and can be scrolled in one direction with respect to an illumination region of the light guide plate. Accordingly, if regions for illuminating the light guide plate by the plurality of pairs of the light source side bundle fibers and the laser light sources are allotted, it is also possible to apply scroll illumination and scanning backlight.

The light guide plate preferably includes a plurality of mirrors in a bar arrangement, which are arranged parallel to the side surface of the light guide plate connected with the plurality of connection side fibers, in the light guide plate and on the other principal surface facing the one principal surface.

In this case, output light from the one principal surface of the light guide plate can be accurately uniformly emitted.

A liquid crystal display device according to the present invention comprises a liquid crystal display panel and a backlight illumination device for illuminating the liquid crystal display panel from behind, wherein any one of the above planar illumination devices is used as the backlight illumination device.

This liquid crystal display device can be realized as a thin liquid crystal display device with a wide color reproduction range, high luminance and high image quality. Further, since laser light can be efficiently utilized, the liquid crystal display device can operated with low power consumption and can highly uniformly emit output light.

Indstrial Applicability

A planar illumination device of the present invention has a thin construction and can efficiently utilize laser light and operate with low power consumption. Further, a liquid crystal display device using the planar illumination device of the present invention as a backlight illumination device has a wide color reproduction range and can display an image with high luminance and realize operation with low power consumption. Therefore, it is useful as a thin liquid crystal display device.

What is claimed is:

1. A planar illumination device, comprising:
a laser light source for emitting laser light;
a light source side bundle fiber having one end surface thereof optically connected with the laser light source;
a flat light guide plate;
a plurality of connection side fibers planarly arranged in parallel with each other at a side surface of the light guide plate; and
a light guiding member for guiding the laser light from the light source side bundle fiber to the plurality of connection side fibers, wherein:
the laser light is incident on the side surface of the light guide plate from the plurality of connection side fibers and output light is uniformly emitted from one principal surface of the light guide plate;
the laser light source includes at least a red laser light source, a green laser light source and a blue laser light source;
the red, green and blue laser light sources emit laser lights to be incident on the one end surface of the light source side bundle fiber;
the light source side bundle fiber includes a plurality of optical fibers; and
the plurality of optical fibers are axially symmetrically bundled for the respective colors.

2. A planar illumination device according to claim 1, wherein
the red laser light source is a semiconductor laser;
the light source side bundle fiber includes a plurality of optical fibers having different core diameters; and
the core diameter of the optical fiber, on which laser light emitted from the red laser light source is incident, is larger than the core diameters of the optical fibers, on which laser lights emitted from the other laser light sources are incident.

3. A planar illumination device according to claim 2, wherein the light source side bundle fiber includes a plurality of optical fibers for guiding red laser light from the red laser light source, a plurality of optical fibers for guiding blue laser light from the blue laser light source and one optical fiber for guiding green laser light from the green laser light source.

4. A planar illumination device, comprising:
a laser light source for emitting laser light;
a light source side bundle fiber having one end surface thereof optically connected with the laser light source;
a flat light guide plate;
a plurality of connection side fibers planarly arranged in parallel with each other at a side surface of the light guide plate;
a light guiding member for guiding the laser light from the light source side bundle fiber to the plurality of connection side fibers; and
a plurality of fiber collimators arranged in parallel with each other in conformity with the plurality of connection side fibers and optically connected with the side surface of the light guide plate, wherein:
the laser light is incident on the side surface of the light guide plate from the plurality of connection side fibers and output light is uniformly emitted from one principal surface of the light guide plate;
the light guiding member includes a light guiding fiber arranged to face the side surface of the light guide plate and adapted to optically connect the light source side bundle fiber and the connection side fibers and emit the laser light from the light source side bundle fiber to the plurality of connection side fibers while distributing it;
the laser light from the plurality of connection side fibers is incident on the side surface of the light guide plate via the plurality of fiber collimators and output light is uniformly emitted from the one principal surface;
the light guiding fiber includes a plurality of branch light guiding fibers;
the planar illumination device further comprises an optical switch element having the opposite sides thereof optically connected with the plurality of branch light guiding fibers and the light source side bundle fiber and a controller for controlling the optical switch element; and
the optical switch element causes the laser light to be incident only on the connection side fiber connected with the selected branch light guiding fiber by selecting at least one of the plurality of branch light guiding fibers and emitting the laser light incident from the light source side bundle fibers to the selected branch light guiding fiber.

5. A planar illumination device according to claim 4, wherein:
each of the plurality of connection side fibers includes a tapered contact portion at one end thereof;
the light guiding fiber is optically connected with the plurality of connection side fibers at contact parts at the leading ends of the contact portions; and
the laser light passes through the contact parts from the light guiding fiber to be incident on the plurality of connection side fibers and guided to the light guide plate.

6. A planar illumination device, comprising:
a laser light source for emitting laser light;
a light source side bundle fiber having one end surface thereof optically connected with the laser light source;
a flat light guide plate;
a plurality of connection side fibers planarly arranged in parallel with each other at a side surface of the light guide plate;
a light guiding member for guiding the laser light from the light source side bundle fiber to the plurality of connection side fibers; and
a plurality of fiber collimators arranged in parallel with each other in conformity with the plurality of connection side fibers and optically connected with the side surface of the light guide plate, wherein:
the laser light is incident on the side surface of the light guide plate from the plurality of connection side fibers and output light is uniformly emitted from one principal surface of the light guide plate;
the light guiding member includes a light guiding fiber arranged to face the side surface of the light guide plate and adapted to optically connect the light source side bundle fiber and the connection side fibers and emit the laser light from the light source side bundle fiber to the plurality of connection side fibers while distributing it;
the laser light from the plurality of connection side fibers is incident on the side surface of the light guide plate via the plurality of fiber collimators and output light is uniformly emitted from the one principal surface;
the light guiding fiber includes a plurality of branch light guiding fibers;
the laser light source and the light source side bundle fiber include a plurality of pairs of light source side bundle fibers and the laser light sources optically connected with the plurality of branch light guiding fibers; and
the planar illumination device further comprises a controller for selecting at least one of the plurality of pairs of the light source side bundle fibers and the laser light sources for operation and controls the plurality of pairs of the light source side bundle fibers and the laser light sources so that the laser light is incident only on the connection side fibers connected with the branch light guiding fiber connected with the selected light source side bundle fiber.

7. A planar illumination device, comprising:
a laser light source for emitting laser light;
a light source side bundle fiber having one end surface thereof optically connected with the laser light source;
a flat light guide plate;
a plurality of connection side fibers planarly arranged in parallel with each other at a side surface of the light guide plate;
a light guiding member for guiding the laser light from the light source side bundle fiber to the plurality of connection side fibers; and
a plurality of fiber collimators arranged in parallel with each other in conformity with the plurality of connection side fibers and optically connected with the side surface of the light guide plate; wherein:
the laser light is incident on the side surface of the light guide plate from the plurality of connection side fibers and output light is uniformly emitted from one principal surface of the light guide plate;

the light guiding member includes a polygon mirror for scanning the laser light from the light source side bundle fiber so that scanning light beams are successively incident on one ends of the plurality of connection side fibers; and the laser light from the plurality of connection side fibers is incident on the side surface of the light guide plate via the plurality of fiber collimators and output light is uniformly emitted from one principal surface.

8. A planar illumination device according to claim 7, wherein:

the one ends of the plurality of connection side fibers are successively arranged at a specified distance from the polygon mirror; and the polygon mirror scans the laser light such that the scanning light beams scan the one ends at a specified scanning speed.

9. A planar illumination device according to claim 1, wherein:

the light guiding member includes an optical scanning member for randomly scanning the laser light from the light source side bundle fiber so that scanning light beams are randomly incident on one ends of the plurality of connection side fibers;

the planar illumination device further comprises a controller for controlling the optical scanning member and a plurality of fiber collimators arranged in parallel with each other in conformity with the plurality of connection side fibers and optically connected with the side surface of the light guide plate;

the controller controls the optical scanning member such that the scanning light beams are successively incident on the one ends of the selected ones of the plurality of connection side fibers; and the laser light from the selected connection side fiber is incident on the light guide plate via the fiber collimator.

10. A planar illumination device according to claim 4, wherein:

the one principal surface of the light guide plate is surrounded by a pair of shorter sides and a pair of longer sides facing each other;

the fiber collimators are optically connected with one of side surfaces of the light guide plate extending along the shorter sides; and the laser light propagates in the light guide plate along the longer sides.

11. A planar illumination device according to claim 1, wherein the light guide plate includes a plurality of mirrors in a bar arrangement, which are arranged parallel to the side surface of the light guide plate connected with the plurality of connection side fibers, in the light guide plate and on the other principal surface facing the one principal surface.

12. A liquid crystal display device, comprising:

a liquid crystal display panel; and a backlight illumination device for illuminating the liquid crystal display panel from behind, wherein the backlight illumination device is the planar illumination device according to claim 1.

* * * * *